US00RE46546E

(19) United States
(12) Reissued Patent
Schoepke et al.

(10) Patent Number: US RE46,546 E
(45) Date of Reissued Patent: Sep. 12, 2017

(54) CONTROL CIRCUIT FOR ELECTRIC UNLOCKING DEVICES USING ACTUATING SOLENOIDS

(71) Applicant: Hanchett Entry Systems, Inc., Phoenix, AZ (US)

(72) Inventors: Edward Schoepke, Reno, NV (US); Leland J. Hanchett, Jr., Falmouth, ME (US)

(73) Assignee: Hanchett Entry Systems, Inc., Phoenix, AZ (US)

(21) Appl. No.: 15/086,844

(22) Filed: Mar. 31, 2016

Related U.S. Patent Documents

Reissue of:
(64) Patent No.: 8,687,341
Issued: Apr. 1, 2014
Appl. No.: 13/023,605
Filed: Feb. 9, 2011

U.S. Applications:
(60) Provisional application No. 61/303,125, filed on Feb. 10, 2010.

(51) Int. Cl.
*H01H 89/00* (2006.01)
*E05B 47/00* (2006.01)

(52) U.S. Cl.
CPC ..... *E05B 47/00* (2013.01); *E05B 47/0046* (2013.01); *Y10T 70/7062* (2015.04)

(58) Field of Classification Search
CPC ... E05B 47/00; E05B 47/0046; Y01T 70/7062
USPC ..... 361/172, 187, 206, 139, 160; 70/277
See application file for complete search history.

(56) References Cited

U.S. PATENT DOCUMENTS 3,601,618 A * 8/1971 Toyonaka et al. ..... 307/9.1
3,909,698 A * 9/1975 Nill ..... 363/79
4,510,778 A * 4/1985 Cotton ..... 68/12.15
4,967,305 A * 10/1990 Murrer et al. ..... 361/172
5,212,360 A * 5/1993 Carlson ..... 219/716
5,392,186 A * 2/1995 Alexander ..... H03K 17/08104 361/118
5,654,865 A * 8/1997 Ryan ..... E05B 47/0046 361/154
6,049,448 A * 4/2000 Lanigan et al. ..... 361/172
6,262,874 B1 * 7/2001 Stoll ..... G05F 1/56 361/154
6,417,651 B1 * 7/2002 Kronberg ..... 323/255
6,847,515 B1 * 1/2005 Kelley ..... H01H 47/043 361/115
7,781,979 B2 * 8/2010 Lys ..... 315/185 S
2003/0016102 A1 * 1/2003 Hoepken ..... 335/6
2003/0234627 A1 * 12/2003 Reinhold et al. ..... 318/434
(Continued)

*Primary Examiner* — Kenneth J Whittington
(74) *Attorney, Agent, or Firm* — Woods Oviatt Gilman LLP; Ronald J. Kisicki, Esq.

(57) ABSTRACT

A system and method is provided for an enhanced and user friendly control circuit for an electric unlocking device, such as for example, an electric door strike or other unlocking devices utilizing actuating solenoids. The control circuit minimizes the potential for human error while also providing a small footprint, minimal DC in-rush current, over current protection, and minimized heat dissipation. Additionally, the present invention is directed to providing visual notification/diagnostics and improved field compatibility with existing electric unlocking devices.

22 Claims, 7 Drawing Sheets

(56) References Cited

U.S. PATENT DOCUMENTS

| | | | | |
|---|---|---|---|---|
| 2005/0168108 | A1* | 8/2005 | Face | 310/330 |
| 2007/0158184 | A1* | 7/2007 | Benham | C23F 13/04 204/196.06 |
| 2011/0194224 | A1* | 8/2011 | Schoepke et al. | 361/170 |
| 2012/0229060 | A1* | 9/2012 | Ritchey et al. | 318/400.3 |

* cited by examiner

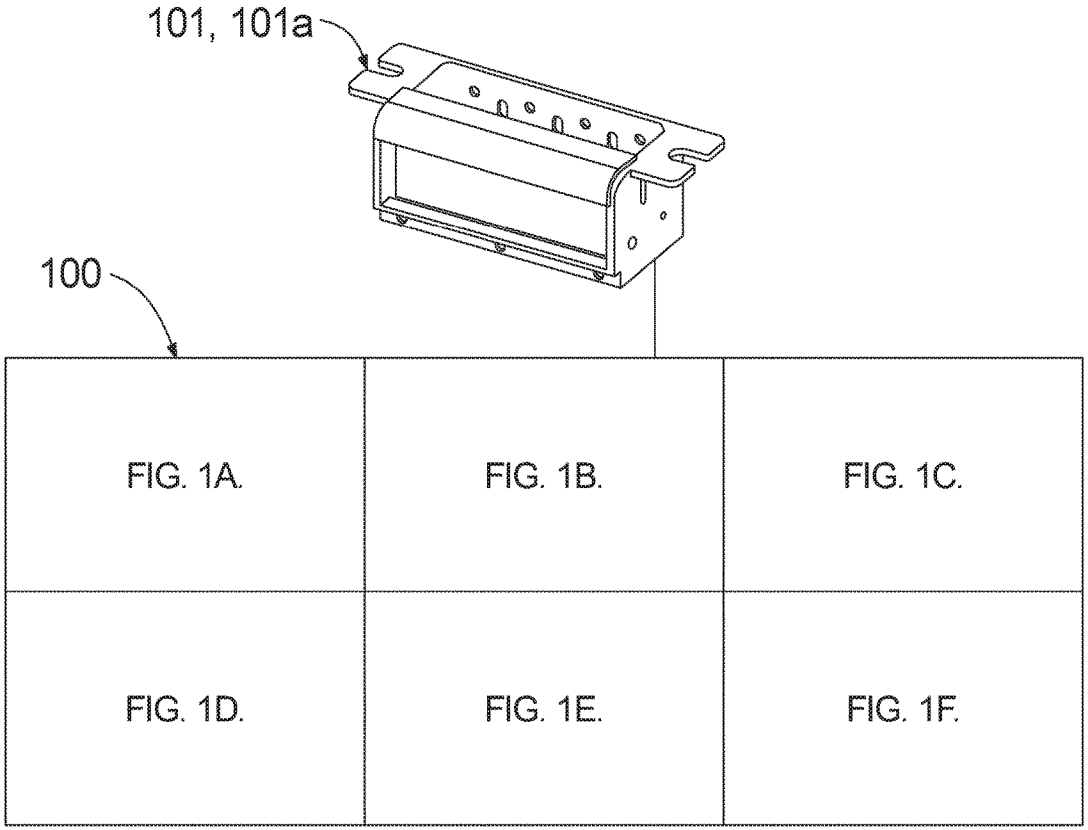
FIG. 1.
AMENDED

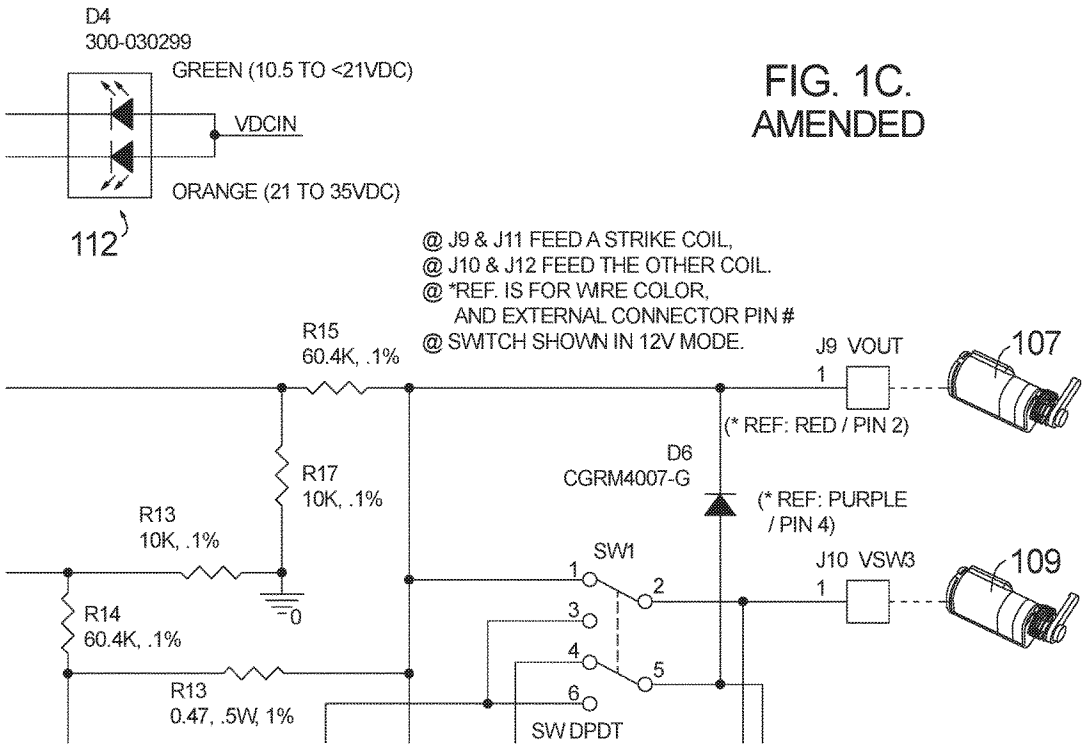
FIG. 1C.
AMENDED

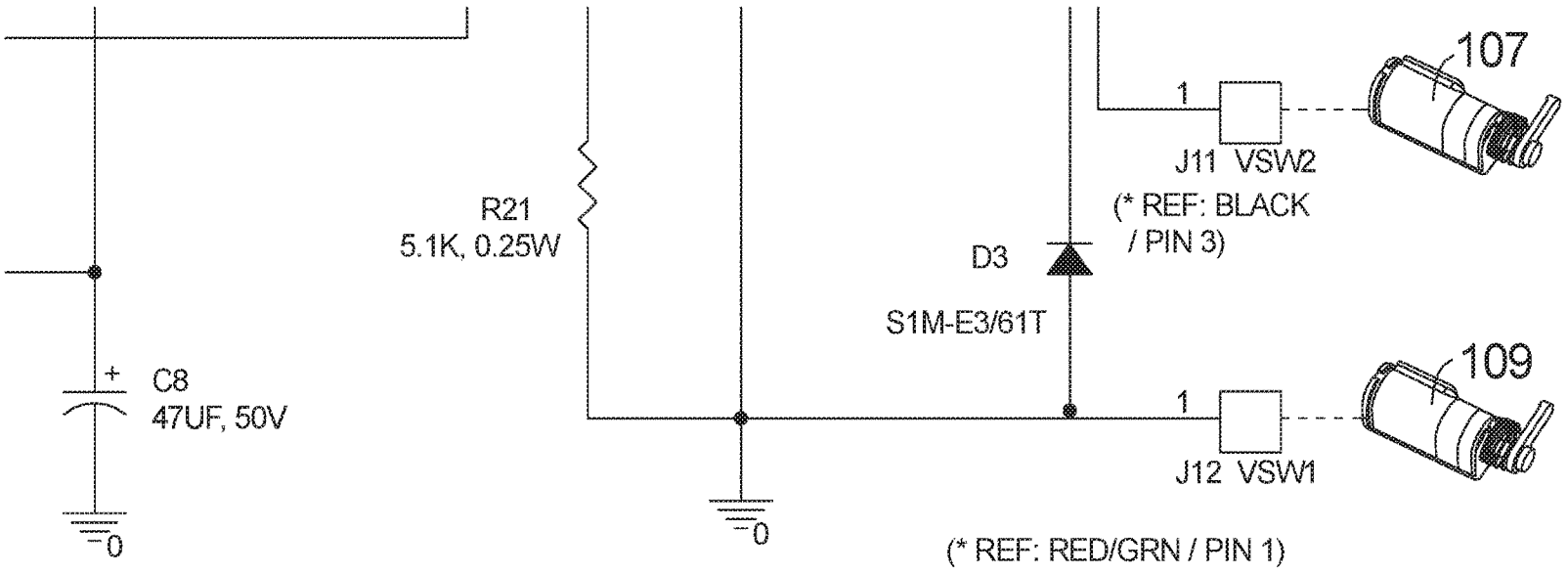
FIG. 1F.
AMENDED

CONTROL CIRCUIT FOR ELECTRIC UNLOCKING DEVICES USING ACTUATING SOLENOIDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Patent Application No. 61/303,125, filed Feb. 10, 2010. U.S. Patent Application No. 61/303,125 is hereby incorporated by reference in its entirety.

FIELD OF THE INVENTION

The present invention generally relates to a system and method for providing an enhanced and user friendly control circuit for electric unlocking devices using actuating solenoids. The inventive control circuit minimizes the potential for human error while also providing a small footprint, minimal DC in-rush current, over current protection and minimized heat dissipation. Additionally, the present invention is directed to providing visual notification/diagnostics and improved field compatibility with existing electric unlocking devices. Examples of electric unlocking devices benefiting from this invention include electrified locks and electric door strikes.

BACKGROUND OF THE INVENTION

There has been wide spread use of keypads and other input devices to provide secure access to buildings or other objects, e.g., safes, automobiles, jail cells, etc. In conjunction with this trend, electric unlocking devices such as, for example, electrified door locks and electric door strikes are routinely used to control entry or access by means of a remote switch or other trigger. For example, it is frequently desirable in a security application to energize an actuator, such as for example a solenoid, used in engaging/disengaging an electric door strike. There may be varying modes of operation for an electric door strike, commonly referred to as "Fail Secure" and "Fail Safe".

In the fail secure mode, a loss of power leaves the door strike in the locked condition. The solenoid that drives the strike to unlock the door may be powered only briefly to unlock the door, and because of the low duty cycle, the average power demand is low. In certain applications (i.e., employer entrance doors) the fail secure strike may be powered for eight or more hours while the door strike is held in an unlocked mode.

In the fail safe mode, the door strike is unlocked by a loss of power. Fail safe strikes are powered continuously except while the door is unlocked. This requires a high duty cycle with relatively high average power demands and heat dissipation. Reducing the heat dissipation in the circuit for such a unit is very desirous for longevity, user safety, etc.

Installers of electric unlocking devices such as electric door strikes are constantly confronted by the lack of standardization in the industry relative to supply voltage for strike operation. Some strikes are designed to operate at 12 or 24, or up to 40 volts DC; others are designed for 12, 16 or 24 VAC. As such, supply voltages ranging from 12 to 40 Volts DC or 12 to 28 Volts AC may be present at a particular location and the installer would need to match the device to the available voltage. As a result, the installer needs to stock a supply of various versions of door strikes and sometimes make complicated adjustments at a consumer site. This creates the opportunity for errors in strike installation or configuration.

It is desirable to provide a system that simplifies installation while accommodating the variations in actuating coil requirements. It is also desirable to determine if an error has been made in the connection of an electric unlocking device, or to receive an indication of other problems with the control circuit. This status information must be readily observable without the need for other equipment or diagnostic tools.

What is needed is a robust and efficient solution that can be universally implemented without the drawbacks described above. A solution that provides simplified and universal connectivity to existing unlocking devices, or new installations of such devices, feedback to the installer, and troubleshooting or diagnostic status while avoiding the short comings of current systems, would be advantageous.

The present invention fulfills these as well as other needs.

SUMMARY OF THE INVENTION

In order to overcome the above stated problems, the present invention provides features and advantages in the control circuit for an electric unlocking device such as for example an electric door strike, wherein a microcontroller is utilized to provide pulse width modulation for voltage control, over current protection, automatic strike voltage level selection and control, and circuit status indication.

In one aspect, the present invention is directed to a control circuit for a solenoid driven electric unlocking device operable in a first or second voltage level range, including: 1) a power stage including an input rectifier and a polyfuse; 2) a microcontroller; 3) a low current voltage regulator to power the micro controller; 4) means for connecting the control circuit to an external power source; 5) switching means for selecting an actuating coil configuration for a connected one of a first or second voltage rated actuating coil, wherein said polyfuse is connected to said external power source and in series with said rectifier to provide over current protection for the control circuit. The input rectifier is operably connected to the external power source to provide a rectified DC voltage at a first or second voltage level range, wherein said voltage regulator has an input connected to the DC output of said input rectifier and an output that is connected to provide power to the microcontroller. The microcontroller operates to provide, in cooperation with other components of the control circuit, the first or second output DC voltage level to power the connected one of said first or second voltage rated actuating coils.

In another aspect, the present invention is directed to utilizing a microcontroller to provide pulse width modulation for the circuit voltage output and also to provide the punch time duration for energizing the electric unlocking device close to full input voltage.

In a further aspect, the present invention is directed to feeding back the state of the actuating coil configuration selection switch to the microcontroller.

In an even further aspect, the present invention is directed to indicating the correctness of the actuating coil configuration selection switch position (high voltage range or low voltage range) with one or more light emitting diodes. The correct voltage available for the installation of the electric unlocking device may also be indicated by said light emitting diodes.

In another aspect, the present invention is directed to providing diagnostic information via light emitting diodes, such as when the selected voltage for operation, as determined by the feedback of said selection switch, is inconsistent with the voltage range for the connected electric unlocking device.

In yet another aspect, the present invention is directed to enabling the microcontroller to remain active in the event of an over current or short circuit situation that blows the polyfuse.

In another aspect, the present invention is directed to providing only a small DC input filtering capacitor connected to the DC output of the rectifier, whereby DC in-rush energy is minimized and external relay contacts feeding the control circuit are protected from the risk of welding.

Additional benefits of the above described system and method for providing controlled power are set forth in the following discussion.

BRIEF DESCRIPTION OF THE DRAWINGS

The above mentioned and other features and advantages of this invention, and the manner of attaining them, will become apparent and be better understood by reference to the following description of the invention in conjunction with the accompanying drawing, wherein:

FIGS. 1A-1F are connecting segments of a schematic drawing of an exemplary electrical control circuit in accordance with the invention. FIG. 1 shows the orientation of each segment (1A-1F) to form the entire electrical control circuit diagram.

DETAILED DESCRIPTION OF A PREFERRED EMBODIMENT

Figure 1A:
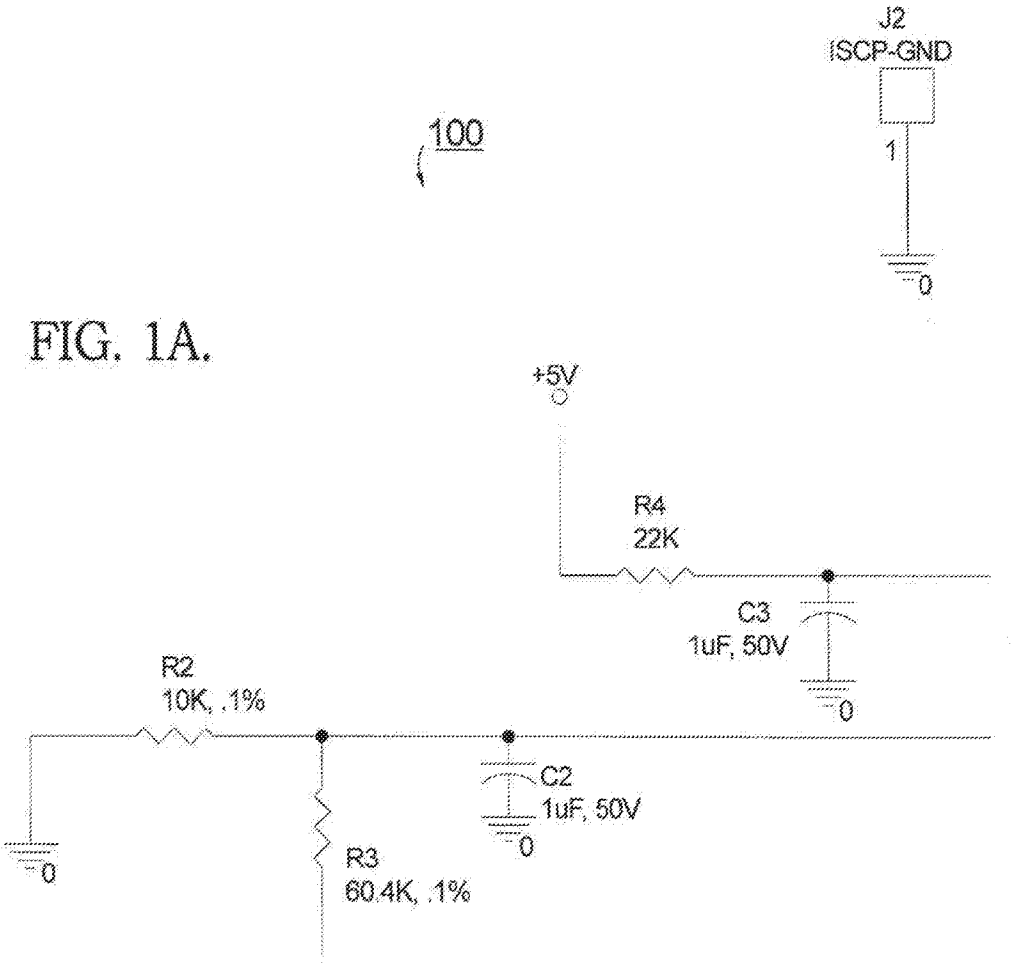

Generally, the systems, components and methods described herein for providing power and control according to the present invention may be implemented in a variety of hardware, software or combinations thereof.

A representative circuitry for enabling the present invention is presented including components, devices and their interconnections.

The present invention generally relates to a system and method for providing power to optimally control an electric unlocking device such as an electric door strike. The present invention provides circuitry to minimize human error, eliminate some field configuration wiring, minimize DC in-rush current, reduce heat dissipation, and provide visual feedback of circuit and field conditions, as well as circuit protection and improved field compatibility with existing electric unlocking devices.

The present invention is applicable to doors, gates or other similar access mediums that may be locked/unlocked remotely or locally by the use of a supplied power source and an electric unlocking device. The invention is described herein with reference to the schematic diagram of FIGS. 1A-1F which illustrates an exemplary control circuit 100 (FIG. 1) *for an solenoid driven electric unlocking device 101, such as an electric door strike 101a.* The control circuit 100 has two ranges of operation, namely a low voltage range and a high voltage range. The low DC voltage range is characterized by an input voltage in the range of approximately 10.5 to just less than 21 VDC. The high DC voltage range is characterized by voltages ranging between 21 and 33 VDC. The low AC voltage range is characterized by an input voltage in the range of approximately 10.5 to just less than 15.5 VACrms. The high AC voltage range is characterized by voltages ranging between 15.5 and 30 VACrms. The various components of the circuit 100 enable and provide the features of the invention that were previously highlighted. More specifically, the circuit comprises a power stage 102, a microcontroller 106, a low current voltage regulator 104 to power the microcontroller, a pair of light emitting diodes (LEDs) 112, a double pole double throw switch SW1, feeds J9, J11 to *a voltage rated actuating coil 107, such as* a first actuating coil [(not shown)], feeds J10, J12 to *a voltage rated actuating coil 109, such as* a second actuating coil [(not shown)], and a number of transistors, diodes, capacitors and resistors. The control circuit 100 enables the receipt, control and passage of power to an actuating coil. The circuit 100 also provides feedback via the LEDs 112 to thereby simplify coil installation and limit the potential for error.

Figure 1B:
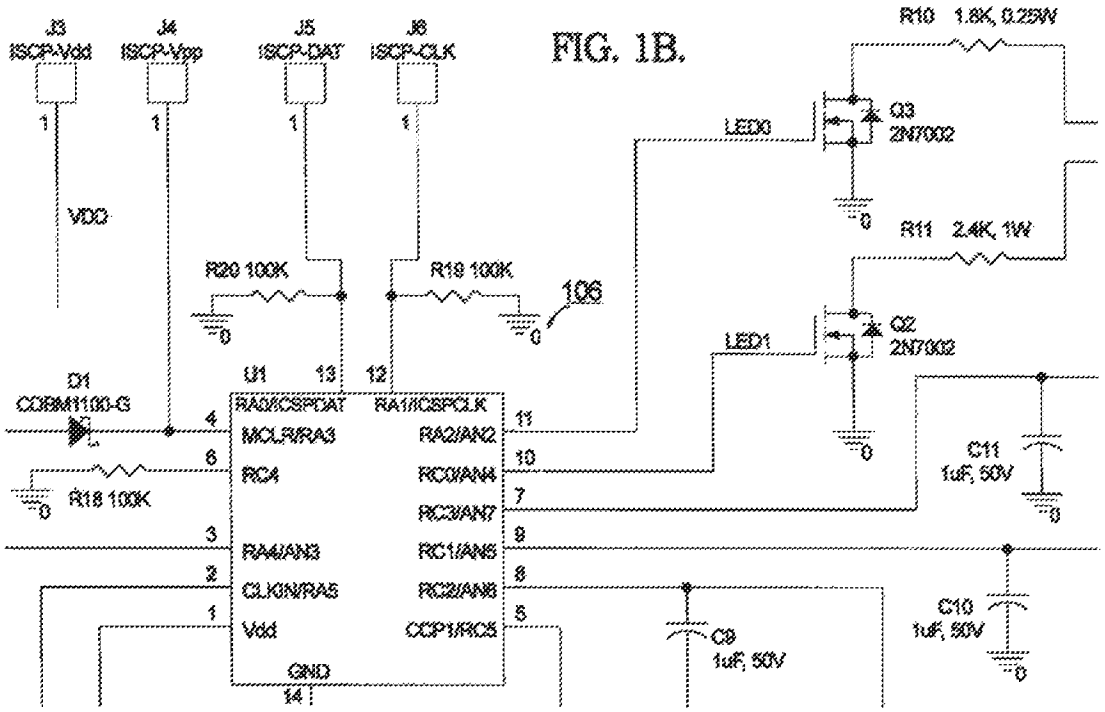
Figure 1D:
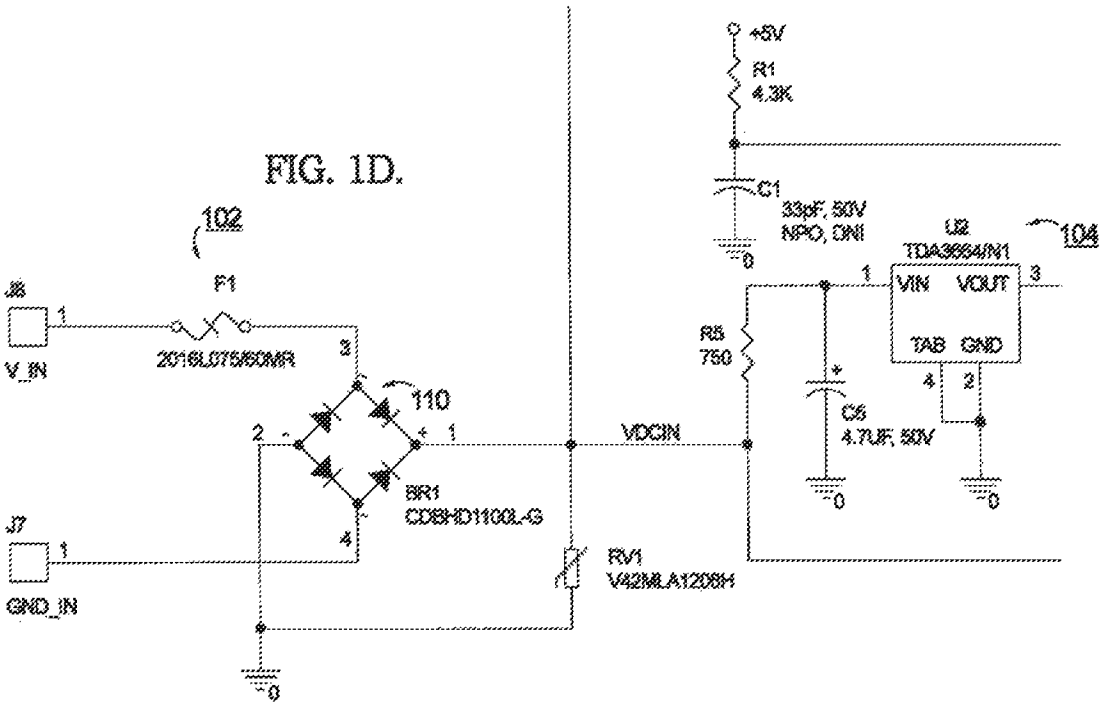
Figure 1E:
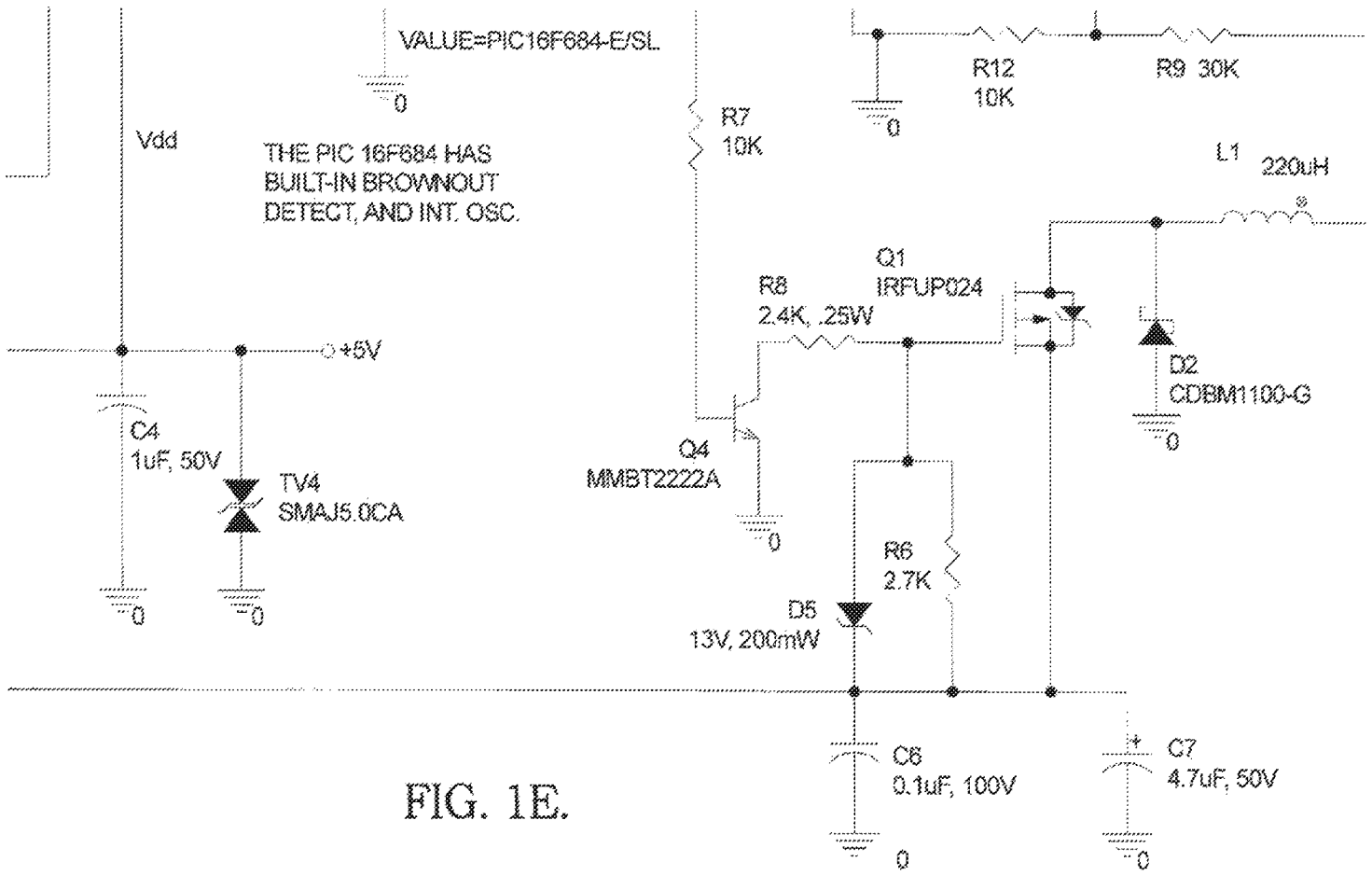

The power stage 102 (FIG. 1D) comprises a bridge rectifier 110 having input terminals 3, 4 and output DC terminals 1, 2. The input terminals 3 and 4 of the bridge rectifier 110 may be connected to an AC or DC power source V_in/GND_in via input connections J7 and J8 independent of the mode of operation, that is, whether in the AC mode or DC mode. When a particular voltage level is applied at the input of bridge rectifier 110, that input voltage results in a comparable level of rectified DC voltage $VDC_{in}$, which represents the input voltage to the subsequent components of the control circuit 100. The negative DC terminal 2 of bridge rectifier 110 is connected to circuit ground 0. The positive DC terminal 1 of bridge rectifier 110 is connected to a filter capacitor C2 (FIG. 1A) to pin 3 of the microcontroller 106 (FIG. 1B). The positive DC terminal of bridge rectifier 110 (FIG. 1D) is also connected to a filter capacitor C5 (FIG. 1D), to the low current voltage regulator 104 (FIG. 1D) and across filter capacitor C6 (FIG. 1E) to the collector of a transistor Q4 (FIG. 1E) and the base of a pass-through MOSFET transistor Q1 (FIG. 1E). A MOSFET transistor is used in circuit 100, in accordance with the invention, because of its lower on-resistance characteristic compared to a BJT transistor. The lower on-resistance translates into lower power dissipation. Recalling that $P=I^2R$, where P is the electric power, R is the resistive load and I the electric current, since the MOSFET transistor offers lower on-resistance, it translates into lower power or heat dissipation.

Connected between power supply J8 and input terminal 3 of the bridge rectifier 110 is a polyfuse F1 (FIG. 1D) for providing a first level of over current protection for the control circuit 100. Notably, the polyfuse F1 is of a type having very low resistance, so as to provide lower heat dissipation as well.

The bridge rectifier 110 utilizing schottky diodes in accordance with the invention exhibits approximately a 0.6 VDC drop for each pair of diodes in the bridge. This is particularly important when working with low voltage electric unlocking devices operating at the low end of the input range. Further, as compared to typical bridge diodes, schottky diodes provide a lower voltage drop across the diode. The lower voltage drop translates to lower power consumption and therefore reduces heat dissipation in the circuit as well.

The low current voltage regulator 104 (FIG. 1D) is utilized to provide power to pin 1 of the microcontroller 106 (FIG. 1B). Low current voltage regulator 104 (FIG. 1D) may be an integrated circuit of the type described as a TDA3864/N1 from Philips Semiconductors which meets the necessary specifications to support the configuration of this embodiment of the present invention. The integrated circuit of the regulator 104 is described in a product specification data sheet dated Dec. 14, 2000, as a fixed 5 V regulator with very low dropout voltage/quiescent current, which operates over a wide supply voltage range. In the present invention, the regulator 104 is utilized to provide a backup function, whereby power is provided to the microcontroller 106 (FIG. 1B) for a short period of time when the supply voltage (i.e., voltage applied at pin 1 of regulator 104 or the control circuit 100 supply power $V_{in}$ is zero) spikes to 0 V or even −1 V, such as when the polyfuse F1 (FIG. 1D) blows. Through this configuration, the microcontroller 106 can remain active when polyfuse F1 is blown.

In the preferred embodiment of the present invention, the microcontroller 106 (FIG. 1B) is an integrated circuit of the type described as PIC16F684 from Microchip Technology Inc. in the publication, PIC12F683 Data Sheet 8-Pin Flash-Based, 8-Bit CMOS Microcontrollers with nano Watt Technology (2004, Microchip Technology Inc.). PIC16F684 meets the necessary specifications to support the configuration of this embodiment of the present invention. The microcontroller 106 comprises input/output ports, timers, comparator module, analog to digital (A/D) conversion, and a pulse width modulation module. In this embodiment of the present invention, the microcontroller 106 is utilized to provide pulse width modulation for output voltage regulation, LED diagnostic indications, circuit control and switch position detection.

The pulse width modulation provides the primary building block required for the control of a switching power supply. In the ordinary use of a pulse width modulator as a control circuit, the pulse width modulator pulses a pass transistor ON and OFF at a fixed frequency and continuously adjusts the duty cycle as needed to regulate the output voltage to a fixed level.

In the present invention, Q1 (FIG. 1E) is the pass transistor. Transistor Q1 is a MOSFET n-channel enhancement-mode device. The microcontroller 106 (FIG. 1B) is configured to operate in an enhanced pulse width modulation mode, with a single pulsed output CCP1/RC5 at pin 5 of the microcontroller 106. The pass transistor Q1 (FIG. 1E) is connected to pin 5 of the microcontroller 106 (FIG. 1B) via transistor Q4 (FIG. 1E). By controlling the pass transistor Q1, the microcontroller can enable or disable power to the connected actuating coil at both of the coil feed pairs via J9, J11 (FIG. 1C) or J10, J12 (FIG. 1F). The pulsed DC voltage delivered by Q1 (FIG. 1E) is filtered by L1 (FIG. 1E) and C8 (FIG. 1F). As Q1 is turned OFF, the energy stored in L1 tends to sustain the current through L1, and recovery zener diode D2 (FIG. 1E) provides a path for inductor current during the OFF time of Q1. Pulse width modulation is achieved by utilizing a clock source to provide timing parameters.

Clock source modes for the microcontroller 106 (FIG. 1B) may be internal to the microcontroller or, optionally, external to the microcontroller. When optionally configured in the external resistor-capacitor (RC) mode, the microcontroller 106 utilizes a clock input at pin 2. Pin 2 of microcontroller 106 is connected between a timing resistor R1 (FIG. 1D) and a timing capacitor C1 (FIG. 1A) to provide the frequency for the pulse width modulation. Timing resistor R1 and timing capacitor C1 are connected in series in an RC network circuit between a 5 V supply and ground 0. By manipulating the RC network circuit signal to pin 2 of the microcontroller 106 (FIG. 1B), the interval for the pulse of the internal timer may be adjusted. In a preferred embodiment, capacitor C1 and resistor R1 are selected to set the timing interval for approximately 0.1 μSec.

Time interval T=RC In(3) where R=4.3K ohm and C=33 Pico farad.

The microcontroller 106 (FIG. 1B) is further configured in a RCIO mode meaning that pin 3 is configured as an additional general purpose input/output (I/O) pin. Pin 3 of microcontroller 106 is connected across filter capacitor C2 (FIG. 1A) to the DC output 1, 2 of the bridge rectifier 110 (FIG. 1D), thereby providing the level of rectified input DC voltage ($VDC_{in}$) to the microcontroller 106. Pin 4 of microcontroller 106 is set up as a Master Clear Reset for the microcontroller 106.

Pin 6 of microcontroller 106 is configured as a general purpose I/O and is tied to ground through resistor R18 (FIG. 1B).

Pin 8 of the microcontroller 106 is configured and connected to sense the position of the switch SW1 (FIG. 1C). The microcontroller 106 determines if there is consistency between the rectified input pulsating voltage $VDC_{in}$ and the preset position of switch SW1 for the voltage level of a particular type of electric unlocking device.

Pins 7 and 9 of the microcontroller 106 (FIG. 1B) are configured and connected to obtain voltage feedback and sense voltage drop in connection with the switching operation of the pass transistor Q1 (FIG. 1E).

Pins 10 and 11 of the microcontroller 106 (FIG. 1B) are configured as I/O ports that are utilized via respective MOSFET transistors Q2 and Q3 (FIG. 1B) to drive the LEDs 112 (FIG. 1C). The LEDs 112 comprise a green LED operable in the approximate range of 10.5 VDC to <21 VDC; and an orange LED operable in the approximate range of 21 VDC to 35 VDC. As earlier described, the rectified supply voltage $VDC_{in}$ is applied to the LEDs 112. LEDs 112 are installed in parallel, with each LED being connected through a resistor R10, R11 (FIG. 1B) to respective transistors Q3, Q2 (FIG. 1B).

Importantly, the microcontroller 106 (FIG. 1B) is "aware" of all control circuit conditions and parameters, i.e., the control circuit input voltage VDCin, switch SW1 (FIG. 1C) position, and the voltage(s) provided to the electric unlocking device *101*. The microcontroller 106 is operably configured to enable or disable power supplied to the electric unlocking device *101* via pass transistor Q1 (FIG. 1E) and provide visual feedback/status via LEDs 112 (FIG. 1C).

The present invention provides a low voltage drop between $VDC_{in}$ and the output voltage at the electric unlocking device *101*, during the two-second punch time. Punch time as used herein refers to the brief time period between when a voltage is first applied to the control circuit, followed by a voltage settling time, and when the voltage drops to the reduced, continuous duty level. The low voltage drop is accomplished by utilizing schottky diodes in the bridge rectifier and MOSFET for the pass transistor Q1, both of which also improve efficiency. For example, when an input voltage of 12 V is first applied, the output voltage of the control circuit 100 of the present invention drops near full input voltage, as for example by approximately 1.5 volts, for approximately two seconds. In the low voltage range of operation this means a voltage as low as 10.5 VDC+/−15% during the two-second punch time for this example.

When in AC operation mode, contact J8 (FIG. 1D) is powered through a conventional power source and receives an input voltage of nominally 12 or 24 Volts AC. Contact J8 is in electrical connection with bridge rectifier 110. Bridge rectifier 110 converts the sine wave to a full wave rectified DC signal VDCin with only minimal smoothing from the 4.7 μf capacitor C7 (FIG. 1E). Traditionally, electronic circuits of this type, that is, those that accept an AC signal to power DC components, first rectify the AC signal, and then the resulting pulsating DC signal is filtered or smoothed before it is applied to the circuit components. The filtering of the pulsating DC signal is typically accomplished by introducing a large value capacitor across the output of the rectifier. For example, a capacitance in the range of approximately 300 μf may be utilized to provide a smoothing of the pulsating DC signal. However, the presence of such a capacitance (300 μF) produces an undesirable characteristic when the circuit is operated in the DC mode.

When in the DC mode, the presence of a large capacitor results in a significant DC in-rush current. A large DC in-rush current can create a spark in the relay supplying power to the circuit each time the relay is activated. Over time, the contacts of the relay can stick or become welded together thereby rendering the circuit inoperable. Circuit 100 of the present invention overcomes this undesirable characteristic by replacing the large filter capacitor with a significantly smaller filter capacitor. Small filter capacitor C7 (FIG. 1E), such as for example a 4.7 μf capacitor, while having a reduced filtering-ability which is acceptable for the application, significantly reduces the level of DC in-rush current. The reduced levels of DC in-rush current from the smaller filter capacitor, when considered together with the resistive loads in the circuit, that is, the length/thickness of wire, the resistance of the polyfuse, etc, effectively reduces the potential for welding together the relay contacts that feed the control circuit 100.

When in the AC mode of operation, the use of the small capacitor C7 (FIG. 1E) results is no filtering of the rectified DC signal VDCin. In other words, the circuit 100 receives a pulsating DC signal. In the preferred embodiment of the present invention, the circuit 100 and the components therein are adapted to operate with the pulsating DC signal and enable the operation of the actuating coils. This is possible because the solenoids used are fast enough to respond to ½ cycle of the incoming AC voltage.

Voltage surge suppression is provided by the connection of a transient surge suppression device RV1 (FIG. 1D) across the output DC terminals of the bridge rectifier 110. The full wave rectified signal VDCin is applied to the voltage regulator 104 (FIG. 1D), the base of the pass transistor Q1 (FIG. 1E) and to an input pin of the microcontroller 106 (FIG. 1)B, which may then enable comparison.

The rectified signal VDCin is applied to the regulator 104 (FIG. 1D), which provides the necessary voltage Vout with a small current, to power the microcontroller 106 (FIG. 1B).

The rectified signal VDCin is applied to the source of transistor Q1 (FIG. 1E). Transistor Q1 has its conduction path (Gate to Drain to Source in the case of a HEXFET power MOSFET) provide pass through fast switching for the control circuit 100.

Having described the components of the present invention along with the interconnections therein, attention is directed next to the operational aspects of the control circuit 100.

When an installer is utilizing a low voltage level electric unlocking device, i.e., a device requiring an operating voltage in the range of 10.5 to <21 VDC, the installer sets the switch SW1 (FIG. 1C) accordingly. The installer then wires a supply voltage V_in, which may be AC or DC to the input of the control circuit 100. This supply voltage V_in must therefore ideally be in the low level range.

In operation, the microcontroller 106 (FIG. 1B), causes either or both the green or orange LEDs 112 (FIG. 1C) to be turned on by applying a signal to the respective pins 10, 11. For example, if as described above, the rectified supply voltage is approximately 12 VDC (low voltage range) and the switch SW1 (FIG. 1C) has been appropriately set for a 12 V electric unlocking device (low voltage range), then the microcontroller 106 (FIG. 1B) having sensed VDCin on pin 3 and the switch position on, pin 8 and finding consistency therewith, would turn ON the pass transistor Q1 (FIG. 1E) to provide power to the actuating coil and also turn ON pin 11 thereby enabling the green LED 112 (FIG. 1C) to be illuminated. Conversely, if the microcontroller 106 (FIG. 1B) detects an inconsistency between the switch setting and the sensed VDCin on pin 3, the pass transistor Q1 (FIG. 1E) would be turned OFF. LEDs 112 (FIG. 1C) would be alternately flashed in a sequence that is indicative of a problem. Similarly, if there are other problems detected, such as an over current situation, the pass transistor Q1 (FIG. 1E) would also be turned OFF and the LEDs 112 (FIG. 1C) would provide diagnostic status information. The microcontroller 106 (FIG. 1B) provides fast response to circuit or external problems. The polyfuse F1 (FIG. 1D) on the other hand detects circuit problems but with a slower response than the microcontroller 106.

Utilizing the various signal level and inputs described earlier, the microcontroller 106 (FIG. 1B) of the present invention may communicate six states via the LEDs 112 (FIG. 1C). Specifically, the following indications are provided by the associated LED flashing sequences and durations:

| | |
|---|---|
| Flashing Green | Input voltage is below low voltage range. |
| Flashing Orange | Input voltage is above high voltage range. |
| Solid Orange | Circuit set to operate the electric unlocking device in the High Voltage Range (between 21 and 33 VDC or between 15.5 and 30 VACrms) |
| Solid Green | Circuit set to operate the electric unlocking device in the Low Voltage Range (between 10.5 and <21 VDC or between 10.5 and 15.5 VACrms) |
| Alternatively Flashing Orange-Green | Over current or short at output of unit |
| Alternatively Flashing Orange-Orange-Green-Green | SW1 in wrong position. |

As would be appreciated by one skilled in the art, the color, sequencing and durations for the flashing of the LEDs may be varied without departing from the scope of the present invention.

From the foregoing, it will be seen that this invention is one well adapted to attain all the ends and objects herein above set forth together with other advantages which are inherent to the method and system. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A control circuit for an electric unlocking device, wherein the *electric unlocking* device is rated for a plurality of voltage levels, *and wherein the electric unlocking device includes one of a first voltage rated actuating coil or a second voltage rated actuating coil,* the control circuit comprising:

a power stage including an input rectifier;

a microcontroller;

a voltage regulator; and means for connecting the control circuit to an external power source having one of said plurality of voltage levels; and

*mechanical* switching means for selecting a specific voltage input level [for a connected] *corresponding to* one of [a plurality of] *the first* voltage rated [actuators] *actuating coil or the second voltage rated actuating coil*;

said input rectifier connected to said external power source to provide a *rectified* DC voltage;

said voltage regulator having an input connected to said rectified DC voltage and an output operably connected to power said microcontroller;

said microcontroller operably connected to provide said rectified DC voltage at said specific voltage input level for [a connected] *the corresponding* one of [a plurality of] *the first* voltage rated [actuators] *actuating coil or the second voltage rated actuating coil* provided that said specific voltage input level selected by said *mechanical* switching means matches a voltage rating of [said connected] *the corresponding* one of [said plurality of] *the first* voltage rated [actuators] *actuating coil or the second voltage rated actuating coil*.

2. The control circuit of claim 1 wherein said voltage regulator is a low current voltage regulator.

3. The control circuit of claim 1 wherein said microcontroller provides pulse width modulation for voltage control and [for determining the punch time duration] for energizing the electric unlocking device near a full input voltage *during a punch time*.

4. The control circuit of claim 1 wherein said *mechanical* switching means is selectively positionable to provide said selected specific voltage input level and a selected position of said *mechanical* switch means is fed back to said microcontroller.

5. The control circuit of claim 4 wherein a correct position of said *mechanical* switching means is indicated by said microcontroller.

6. The control circuit of claim 5, further comprising at least one light emitting diode wherein said correct position of said *mechanical* switching means is indicated by illumination of said at least one light emitting diode.

7. The control circuit of claim 1 wherein said specific voltage input level for the [connected] *corresponding* one of [said actuators] *the first voltage rated actuating coil or the second voltage rated actuating coil* is indicated by said microcontroller.

8. The control circuit of claim 7 further comprising at least one light emitting diode, wherein said specific voltage input level for the [connected] *corresponding* one of [said actuators] *the first voltage rated actuating coil or the second voltage rated actuating coil* is indicated by illumination of said at least one light emitting diode.

9. The control circuit of claim 4 further comprising at least one light emitting diode, wherein *said microcontroller is configured to illuminate said at least one light emitting diode* if the selected position of said *mechanical* switch means is inconsistent with the specific voltage input level for the [connected] *corresponding* one of [said plurality of] *the first* voltage rated [actuators, said at least one light emitting diode is illuminated to convey the inconsistency] *actuating coil or the second voltage rated actuating coil*.

10. The control circuit of claim 9 wherein said at least one light emitting diode includes first and second light emitting diodes, and [said first and second light emitting diodes] *wherein said microcontroller is configured to* convey the inconsistency by an alternating sequencing or pulsating of each of said first and second light emitting diodes.

11. The control circuit of claim 1 further including a polyfuse connected to said external power source and to said rectifier to provide secondary over current protection for the control circuit, wherein said polyfuse includes a first closed circuit state and a second blown circuit state, and wherein said [circuit is configured so that said microcontroller remains powered and active] *voltage regulator operates to provide power to said microcontroller* for a short *period of* time when said polyfuse is in said second blown circuit state.

12. The control circuit of claim 1 further comprising a DC input filtering capacitor connected to an output of said rectifier wherein said DC input filtering capacitor is configured to reduce DC in-rush energy and welding together of relay contacts feeding the control circuit.

13. The control circuit of claim 12 wherein said DC input filtering capacitor is a 4.7 μf capacitor.

14. The control circuit of claim 1 wherein said rectified DC voltage is provided via a low on-resistance transistor switch.

15. The control circuit of claim 14 wherein said low on-resistance transistor switch is a MOSFET transistor.

16. The control circuit of claim 1 further comprising at least one light emitting diode wherein at least one of an over current or shorts at an output of the control circuit is indicated by illumination of said at least one light emitting diode.

17. The control circuit of claim 1 wherein said electric unlocking device is an electric door strike.

18. The control circuit of claim 17 wherein said electric door strike is solenoid driven.

19. The circuit of claim 1 wherein said DC voltage provided by said input rectifier is a pulsating unfiltered signal.

20. The circuit of claim 19 wherein said pulsating unfiltered signal operates a solenoid driven electric unlocking device.

*21. A control circuit for an electric unlocking device, wherein the electric unlocking device is rated for a plurality of voltage levels, and wherein the electric unlocking device includes one of a first voltage rated actuating coil or a second voltage rated actuating coil, the control circuit comprising:*

*an input rectifier;*

*a microcontroller;*

*a voltage regulator; and*

*means for connecting the control circuit to an external power source having one of said plurality of voltage levels;*

*mechanical switching means for selecting a specific voltage input level corresponding to one of the first voltage rated actuating coil or the second voltage rated actuating coil;*

*said input rectifier connected to said external power source to provide a rectified DC voltage;*

*said voltage regulator having an input connected to said rectified DC voltage and an output operably connected to power said microcontroller;*

*said microcontroller operably connected to provide pulse width modulation for voltage control.*

*22. The control circuit in accordance with claim 21 wherein said pulse width modulation is used during a punch time for energizing the unlocking device near a full input voltage.*

* * * * *